United States Patent [19]
Chang

[11] Patent Number: 5,769,194
[45] Date of Patent: Jun. 23, 1998

[54] LUGGAGE TRUCK

[75] Inventor: Fu-Chin Chang, Taipei, Taiwan

[73] Assignee: Tandu Incorporation Canniness Import-Export Associated Ltd., Taipei, Taiwan

[21] Appl. No.: 732,850

[22] Filed: Oct. 15, 1996

[51] Int. Cl.$^6$ .............................. A45C 5/14; A45C 13/28
[52] U.S. Cl. ......................... 190/18 A; 190/39; 190/115; 16/115; 280/37
[58] Field of Search ..................... 190/39, 18 A, 190/115–117; 16/115; 280/37, 655, 655.1

[56] References Cited

U.S. PATENT DOCUMENTS

| | | | |
|---|---|---|---|
| 4,630,837 | 12/1986 | Kazmark | 280/47.29 X |
| 5,116,289 | 5/1992 | Pond et al. | 190/115 X |
| 5,306,027 | 4/1994 | Cheng | 280/655 X |
| 5,338,054 | 8/1994 | Imai et al. | 280/655 |
| 5,435,423 | 7/1995 | Rekuc et al. | 190/115 X |
| 5,505,471 | 4/1996 | Cheng | 280/655 X |
| 5,519,919 | 5/1996 | Lee | 280/655 X |
| 5,547,053 | 8/1996 | Liang | 190/115 |
| 5,553,692 | 9/1996 | Sheiman | 190/115 X |

FOREIGN PATENT DOCUMENTS 1593494  7/1981  United Kingdom ................... 280/655

*Primary Examiner*—Sue A. Weaver
*Attorney, Agent, or Firm*—Jacobson, Price, Holman & Stern, PLLC

[57] ABSTRACT

A luggage truck includes a base frame fixedly fastened to a luggage body at the bottom, two parallel sleeves respectively pivoted to the base frame and joined by a transverse connecting bar, two sliding tubes respectively sliding in the sleeves and joined by a handle grip outside the sleeves, and two sliding coupling devices moved on the sleeves and coupled to a locating frame at the rear side of the luggage body, each sliding coupling device including a sliding block mounted around one sleeve, a connector having a first coupling tube coupled to the sliding block and a second coupling tube extended from the first coupling tube at right angles, a first link having a hooked bottom end inserted into a through hole in the sliding block and hooked on the first coupling tube of the connector and a top end coupled to the handle grip, and a second link having one end pivoted to the locating frame of said luggage body and an opposite end connected to the second coupling tube of the connector.

3 Claims, 5 Drawing Sheets

LUGGAGE TRUCK

BACKGROUND OF THE INVENTION

The present invention relates to luggage trucks, and relates more particularly to such a luggage truck which comprises a base frame fixedly fastened to a luggage body at the bottom, two parallel sleeves respectively pivoted to the base frame and joined by a transverse connecting bar, two sliding tubes respectively sliding in the sleeves and joined by a handle grip outside the sleeves, and two sliding coupling devices moved on the sleeves and coupled to a locating frame at the rear side of the luggage body, each sliding coupling device including a sliding block mounted around one sleeve, a connector having a first coupling tube coupled to the sliding block and a second coupling tube extended from the first coupling tube at right angles, a first link having a hooked bottom end inserted into a through hole in the sliding block and hooked on the first coupling tube of the connector and a top end coupled to the handle grip, and a second link having one end pivoted to the locating frame of said luggage body and an opposite end connected to the second coupling tube of the connector.

A regular luggage truck is generally comprised of a base frame equipped with rollers, a luggage body fixedly fastened to the base frame at the top, two parallel sleeves fixedly secured to the luggage body at the back side, two retracting tubes mounted in the sleeves and joined by a handle grip. When in use, the retracting tubes are extended out of the sleeves, and then the base frame is tilted backwardly toward the user, permitting the center of gravity of the luggage truck to be shifted to the rollers at the rear side adjacent to the user, so that the luggage truck can be moved in any desired direction. However, because the center of gravity of the luggage truck is shifted to the rear rollers when moving, the user must employ much effort to move the luggage truck, and the rear rollers are more difficult to be turned.

SUMMARY OF THE INVENTION

The present invention has been accomplished to provide a luggage truck which eliminates the aforesaid drawbacks. According to the preferred embodiment of the present invention, the luggage truck comprises a luggage body equipped with rollers, a base frame fastened to the luggage body at the bottom near the back side and having rollers for moving on the ground, two sleeves pivoted to the base frame and turned thereabout relative to the back side of the luggage body, two sliding tubes joined by a handle grip outside the sleeves and moved in and out of the sleeves, and two sliding coupling devices respectively moved along the sleeves and coupled to a locating frame at the back side of the luggage body. Each of the sliding coupling devices has a first link connected to he handle grip, and a second link pivoted to the locating frame of he luggage body. When the sliding tubes are extended out of the sleeves, the sliding coupling devices are pulled upwards along the sleeves, and the second links are simultaneously turned upwards to a horizontal position to force the sleeves and the sliding tubes outwards from the back side of the luggage body so that the handle grip can be conveniently pushed with the hand to move the luggage truck on the ground.

BRIEF DESCRIPTION OF THE DRAWINGS

FIG. I is a perspective exploded view of a part of a luggage truck according to the present invention.

DETAILED DESCRIPTION OF THE PREFERRED EMBODIMENT

Figure 1:
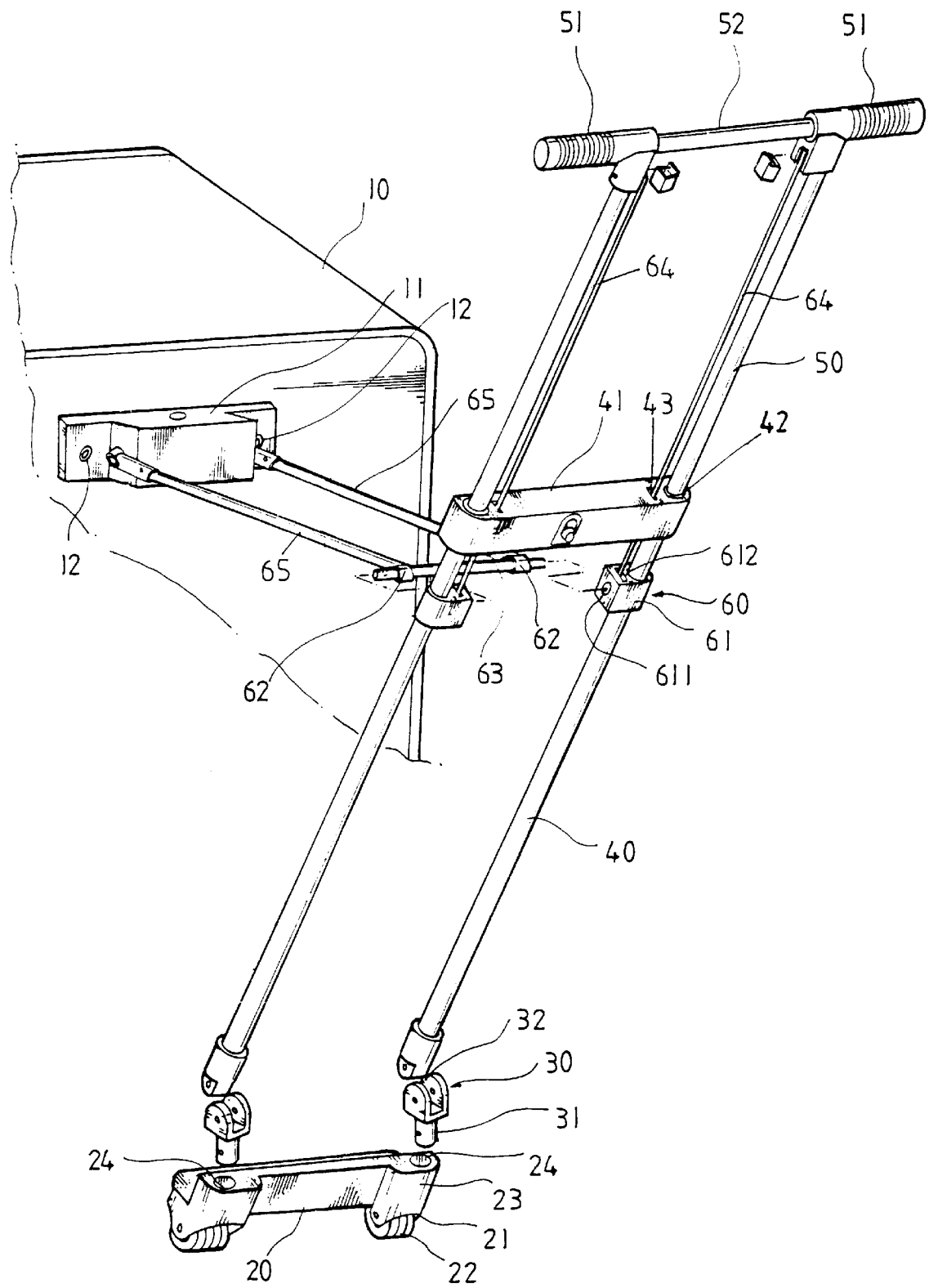
Figure 2:
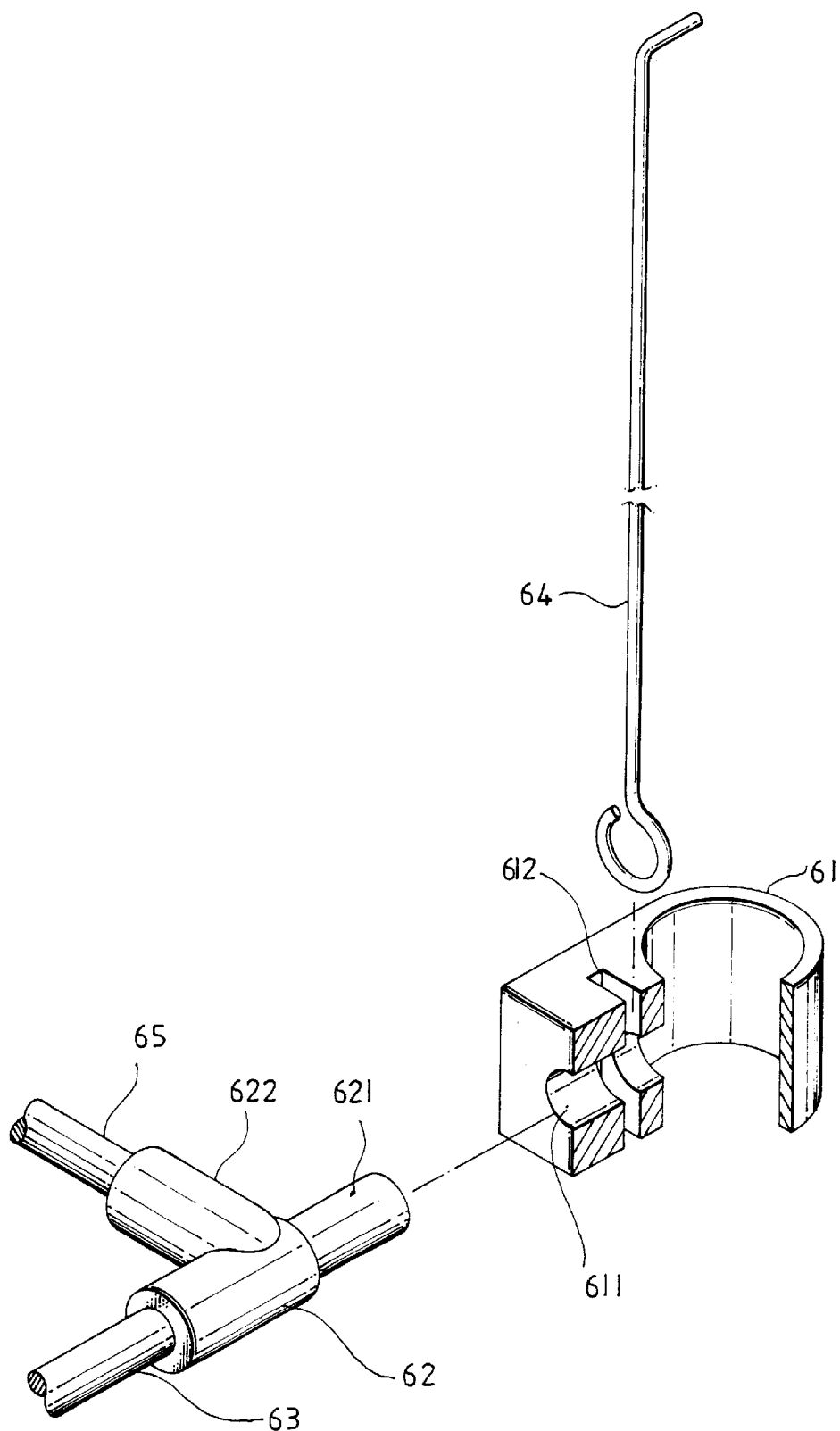
FIG. 2 is an exploded view of a sliding coupling device according to the present invention.
Figure 3:
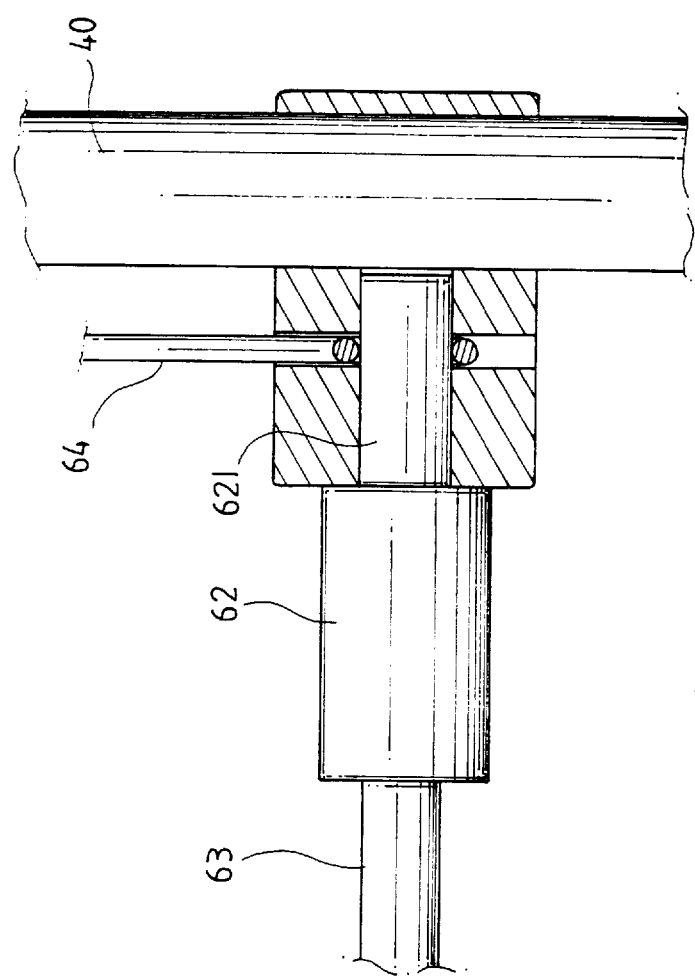
FIG. 3 is a sectional assembly view of the sliding coupling device shown in FIG. 2.
Figure 4:
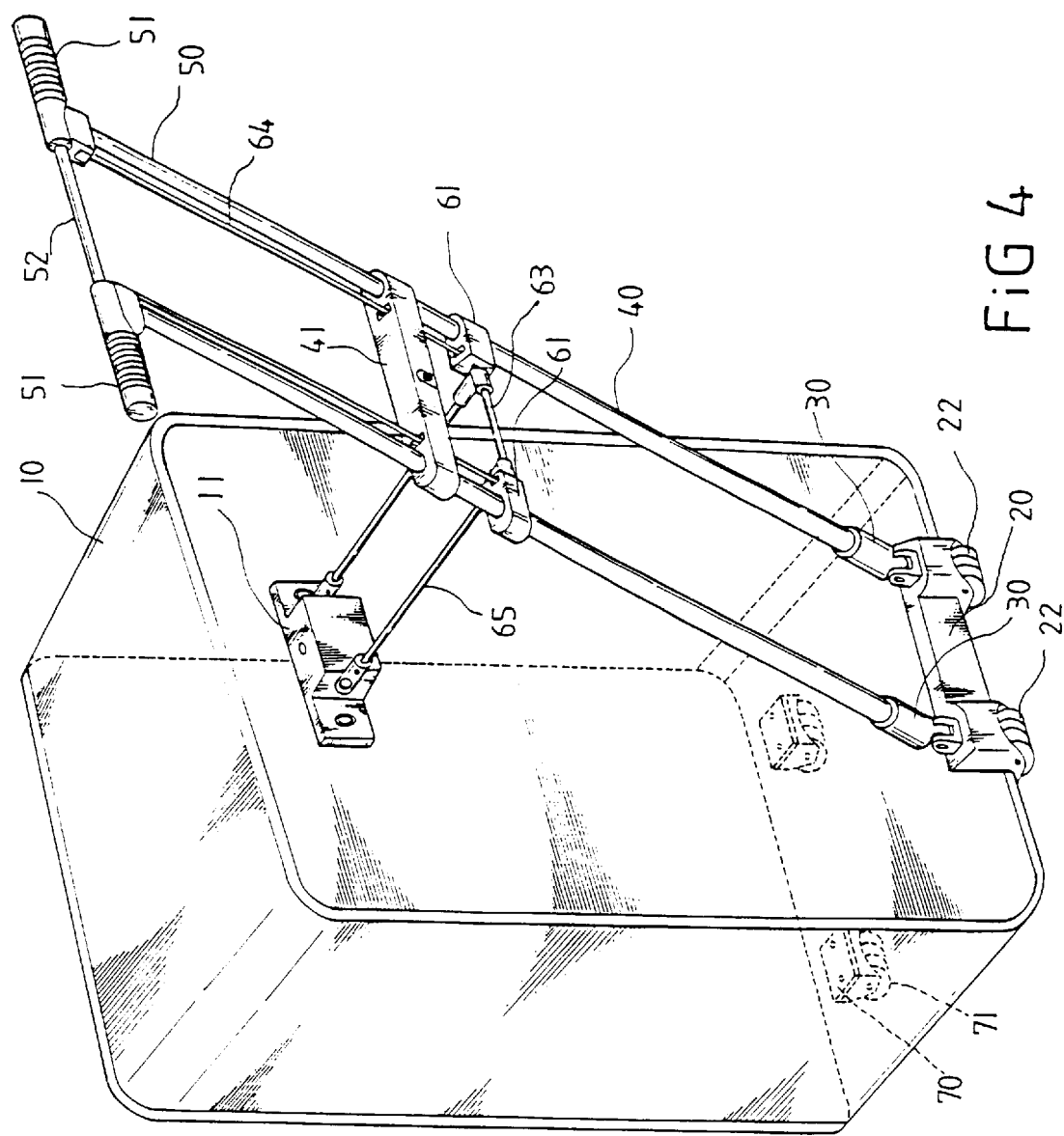
FIG. 4 is a perspective elevational view of the present invention, showing the luggage truck arranged in the operative condition; and, FIG. 5 is another perspective elevational view of the present invention, showing the luggage truck collapsed.
Figure 5:
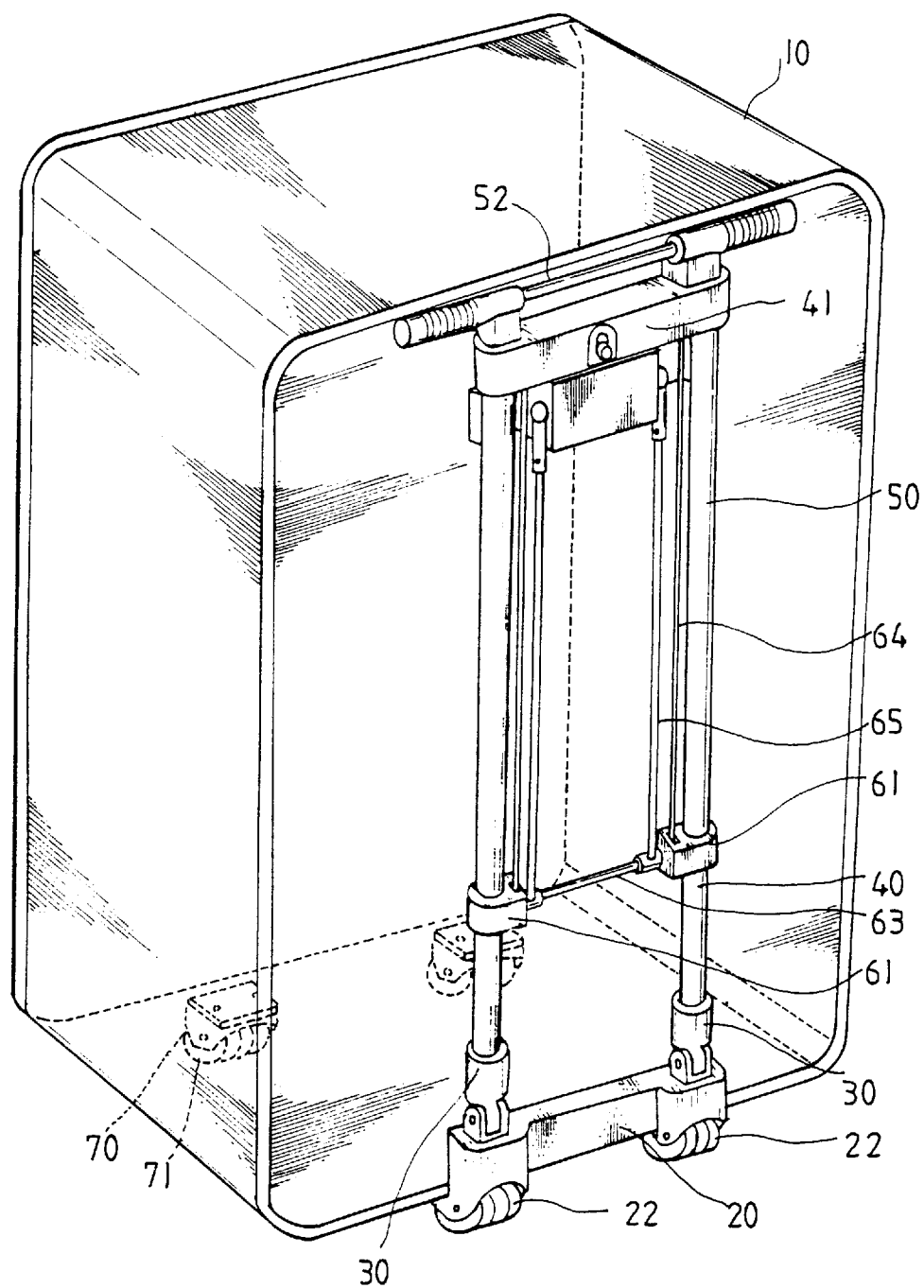

Referring to FIGS. 1, 2, and 3, the luggage body, referenced by 10, is adapted for holding personal items, having a locating frame 11 fixedly secured to a rear side thereof near the top. The locating frame 11 of the luggage body 10 has two lugs 12 horizontally disposed at two opposite sides. The base frame, referenced by 20, is fixedly fastened to the luggage body 10 at the bottom, having two bottom roller chambers 21, two rollers 22 respectively mounted in the bottom roller chambers 21, and two upward extension portions 23 respectively attached to the rear side of the luggage body 10. Each upward extension portion 23 defines a respective vertical through hole 24. Two holder frames 30 are respectively installed in the base frame 20 at the top. Each holder frame 30 comprises a mounting axle 31 at the bottom fastened to the vertical through hole 24 of one upward extension portion 23 of the base frame 20, and a pivot holder 32 at the top. Two sleeves 40 are arranged in parallel, having a respective bottom end respectively pivoted to the pivot holders 32 of the holder frames 30, and a respective top end connected in parallel to each other by connecting means for example a transverse connecting bar 41. The transverse connecting bar 41 has two axle holes 42 to which the sleeves 40 are respectively fastened, and two through holes 43 respectively disposed in parallel and adjacent to the axle holes 42. Two tubes 50 are respectively moved in and out of the sleeves 40, having a respective free (top) end fixedly connected with an outwardly disposed horizontal socket 51 at right angles. A handle grip 52 is connected between the horizontal sockets 51 of the tubes 50. Two sliding coupling devices 60 are respectively mounted on the sleeves 40 and connected together by a connecting rod 63, and simultaneously moved between the transverse connecting bar 41 and the holder frames 30. Each sliding coupling device 60 comprises a sliding block 61 mounted around one sleeve 40 and having a horizontal axle hole 611 and a vertical through hole 612 in vertical alignment with one through hole 43 of the transverse connecting bar 41, a connector 62 having a first coupling tube 621 and a second coupling tube 622 arranged at right angles, a first link 64 connected between one horizontal socket 51 and the sliding block 61, and a second link 65 connected between the locating frame 11 and the connector 62. The aforesaid connecting rod 63 are connected between the connectors 62 of the sliding coupling devices 60. The first coupling tubes 621 of the connectors 62 of the sliding coupling devices 60 are respectively fitted into the horizontal axle holes 611 of the sliding blocks 61. The first links 64 of the sliding coupling devices 60 are respectively inserted through the vertical through holes 612 of the sliding blocks 61 and the through holes 43 of the transverse connecting bar 41, having a respective hooked bottom end respectively hooked on the first coupling tubes 621 of the connectors 62, and a respective top end respectively coupled to the horizontal sockets 51. Each of the second links 65 of the sliding coupling devices 60 has one end inserted into the second coupling tube 622 of one connector 62, and an opposite end pivoted to one lug 12 of the locating frame 11. Furthermore, two wheel holders 70 are respectively fastened to the luggage body 10 on the outside at the bottom to hold a respective roller 71.

Referring to FIGS. 2, 3, 4, and 5, when in use, the handle grip 52 is pulled outwards from the luggage body 10 to turn the sleeves 40 about the holder frames 30 and to move the sleeves away from the luggage body 10, and at the same time the handle grip 52 is pulled upwards to lift the tubes 50 out of the sleeves 40. When the tubes 50 are extended out of the sleeves 40, the first links 64 are simultaneously moved with the sockets 51, thereby causing the sliding blocks 61 of the sliding coupling devices 60 to be lifted by the first links 64 along the sleeves 40. Because each second link 65 has one end pivoted to the locating frame 11 and an opposite end connected to one sliding coupling device 60, the sleeves 40 are tilted relative to the luggage body 10 when the sliding coupling devices 60 are moved upwards with the first links 64 along the sleeves 40. Therefore, when the sleeves 40 are tilted, the luggage body 10 and the base frame 20 are maintained immovable, and the weight of the luggage body 10 is evenly carried on the rollers 22 of the base frame 20 and the rollers 71 of the luggage body 10, enabling the luggage body 10 to be moved smoothly on the ground (see FIG. 4). On the contrary, when not in use, the sleeves 40 are turned inwards toward the luggage body 10, and at the same time the handle grip 52 is forced downwards to push the tubes 50 back to the inside of the sleeves 40. When the handle grip 52 is forced downwards toward the transverse connecting bar 41, the sliding coupling devices 60 are moved downwards along the sleeves 40, therefore the second links 65 are turned downwards and closely attached to the luggage body 10, and the sleeves 40 are turned upwards and closely attached to the luggage body 10 (see FIG. 5).

While only one embodiment of the present invention has been shown and described, it will be understood that various modifications and changes could be made thereunto without departing from the spirit and scope of the invention disclosed.

What the invention claimed is:

1. A luggage truck comprising:
 a luggage body adapted for holding things, said luggage body having a locating frame fixedly secured to a rear side thereof near a top side thereof, at least one roller holder respectively and fixedly secured to a bottom side thereof and holding a respective roller;
 a base frame fixedly secured to the bottom side of said luggage body and holding at least one roller for moving on the ground;
 a plurality of parallel sleeves respectively pivotally mounted on said base frame and pivotal on said base frame relative to the rear side of said luggage body;
 a plurality of sliding tubes joined by a handle grip outside said sleeves, and movable in and out of said sleeves; and
 a plurality of sliding coupling devices respectively mounted around said sleeves and coupled to said handle grip and the locating frame of said luggage body for permitting said sleeves to be moved between a tilted position in which said handle grip can be pushed with the hand to move the luggage truck on the ground, and a vertical position in which said sleeves and said handle grip are located adjacent to the rear side of said luggage body;
 wherein each of said sliding coupling devices comprises:
  a sliding block mounted around one sleeve and having a horizontal axle hole and a vertical through hole;
  a connector having a first coupling tube and a second coupling tube arranged at right angles, said first coupling tube being connected to the horizontal axle hole of one sliding block;
  a first link having a hooked bottom end inserted into the vertical through hole of said sliding block and hooked on the first coupling tube of said connector, and a top end coupled to said handle grip; and
  a second link having one end pivotally mounted on the locating frame of said luggage body, and an opposite end connected to the second coupling tube of said connector.

2. The luggage truck of claim 1 wherein a transverse connecting member is fastened to one end of each of said sleeves remote from said base frame to hold said sleeves in parallel, and adapted for supporting said handle grip when said sliding tubes are respectively received inside said sleeves.

3. The luggage truck of claim 1 wherein the connectors of said sliding coupling devices are respectively connected to one another by connecting means.

\* \* \* \* \*